2,810,755
RECOVERY OF CITRIC ACID

Robert C. Ayers, Jr., Valley Stream, N. Y., assignor to Chas. Pfizer & Co., Inc., Brooklyn, N. Y., a corporation of Delaware No Drawing. Application July 28, 1954,
Serial No. 446,387

3 Claims. (Cl. 260—537)

This invention is concerned with a novel method for the recovery of citric acid from an aqueous solution, for example, from a fermentation mixture in which it was prepared. More particularly it is concerned with the recovery of citric acid by the precipitation of dicalcium acid citrate.

For years the method of recovery of citric acid has involved precipitating tricalcium citrate, the normal salt, by the addition of an equivalent amount of lime to the citric acid solution. The tricalcium citrate is removed by filtration and then treated with sulfuric acid. Calcium sulfate is precipitated and filtered off, and there remains a concentrated solution of citric acid, from which the citric is recovered by evaporation.

Precipitation of dicalcium acid citrate rather than tricalcium citrate possesses several advantages, the most important being that one-third less lime is required for the precipitation, and one-third less sulfuric acid is required for subsequent regeneration of the citric acid. Another advantage of this novel method lies in the fact that dicalcium acid citrate has a definite crystalline structure, and washes cleaner than the amorphous tricalcium citrate. Still another advantage is that fewer impurities are precipitated from a fermentation mixture along with the dicalcium salt, than are precipitated with the normal salt when the reaction mixture is completely neutralized.

Despite these advantages, until the present invention, attempts to recover citric acid by precipitation of dicalcium acid citrate were all unsuccessful. For example, if two-thirds of the amount of calcium hydroxide required for complete neutralization is added at room temperature to a solution of citric acid, rather than dicalcium acid citrate precipitating, two-thirds of the citric acid present will precipitate as tricalcium citrate, and the other third of the citric acid will remain in solution. This result can probably be interpreted as indicating that tricalcium citrate precipitates at a faster rate than dicalcium acid citrate. This difficulty was the most serious one that had to be overcome by the present invention.

It is believed, on the basis of the present experiments, that an equilibrium exists between tricalcium citrate and citric acid on the one side, and dicalcium acid citrate on the other.

$$Ca_3(C_6H_5O_7)_2 + H_3C_6H_5O_7 \rightleftarrows 3CaHC_6H_5O_7$$

At room temperature the rate of the reaction to the right is vanishingly slow, and tricalcium citrate will remain unchanged in contact with a solution of citric acid. If the temperature is elevated to 40° C. or above, and a mole of tricalcium citrate is mixed with an aqueous solution containing a mole of citric acid, at the end of 24 hours there is complete conversion to dicalcium acid citrate. On the other hand, an aqueous slurry of dicalcium acid citrate will remain unchanged for 24 hours at 40° C. These experiments indicate that the equilibrium between citric acid, tricalcium citrate and dicalcium acid citrate is located at virtually 100% dicalcium acid citrate. At low temperatures the rate of reaction to the right may be so slow as to be unnoticeable, but at higher temperatures the reaction will take place in a reasonable length of time.

While the above theoretical discussion is consistent with the experimental facts and is believed to be correct, it is given by way of explanation only, and this invention is not intended to be limited by the above theory or conclusions therefrom.

Two new experimental results have been observed. The first of these is that dicalcium citrate will precipitate at elevated temperatures from a citric acid solution to which tricalcium citrate has been added. The second is that dicalcium acid citrate will precipitate at an elevated temperature from a citric acid solution which has been partially neutralized by the addition of calcium hydroxide, calcium oxide or calcium carbonate. Since this neutralization leads first to the formation of tricalcium citrate, which then reacts with the citric acid, it is seen that these two results are simply different manifestations of the same underlying principle.

In accord with the foregoing discussion, a new process for the recovery of citric acid from an aqueous solution has been developed. For example, a citric acid solution may be divided into two parts. The first part, about ⅔ of the total, may be completely neutralized with calcium hydroxide, calcium oxide or calcium carbonate, and the tricalcium citrate which precipitates may be filtered off and added to the remaining part of the original citric acid solution. If the resulting mixture of tricalcium citrate and citric acid is heated above 40° C., a precipitate of dicalcium acid citrate will result. As an alternative method, an amount of calcium hydroxide, calcium oxide or calcium carbonate no greater than ⅔ of that required for complete neutralization may be added directly to a citric acid solution. If this is done at room temperature, a precipitate of tricalcium citrate will result, and the reaction will stop there. This mixture of tricalcium citrate and citric acid may then be converted to dicalcium acid citrate by heating above 40° C. If the addition of calcium hydroxide, calcium oxide or calcium carbonate is carried out at elevated temperatures, a precipitate of dicalcium acid citrate will result from the continuous reaction between the citric acid and the tricalcium citrate which is formed. The addition of calcium hydroxide or calcium oxide to water at room temperature will, of course, cause an increase in temperature. This heat of reaction, however, is not sufficient of itself to maintain the required high temperature, and heat from an external source must be applied.

These results may be summarized by saying that a precipitate of dicalcium acid citrate is formed when an aqueous citric acid solution is heated above 40° C. with a calcium containing compound selected from the group consisting of tricalcium citrate, calcium hydroxide, calcium oxide and calcium carbonate.

It appears that any temperature above about 40° C. is sufficiently high to result in the formation of dicalcium acid citrate by any of the methods described above in a reasonable time. Temperatures above about 70° C., however, are most convenient, since reaction time is shorter at higher temperatures. The range from 80° to 95° C. is particularly useful. The boiling point of the solution is the upper limit of the advantageous temperature range. One experiment, however, was successfully conducted at 115° C. under pressure. Besides the inconvenience involved, however, other disadvantages were encountered. The rate of reaction under pressure appeared to be slower at this temperature for some unknown reason, and the product obtained was in a very finely divided form which made subsequent handling difficult.

It has also been found that the results may be improved, both by shortening the required time and by increasing the yield, if the mixture to be converted to dicalcium acid citrate is seeded with dicalcium acid citrate. The range of concentrations of seed used is not critical, increasing amounts of seed giving better results. For practical considerations it is preferred to use about 10 to 25% of the expected yield as seed.

Microscopic examination of the precipitate serves as a convenient check upon the progress of the reaction. The well defined crystals of dicalcium acid citrate may readily be distinguished from the amorphous tricalcium citrate.

*Example I*

One mole (192 grams) of citric acid was dissolved in water to give a solution volume of two liters. To this solution there was added 1 mole (498 grams) of tricalcium citrate. The mixture was heated to 40° C. and maintained at that temperature. At the end of 23 hours, during which time stirring was employed, the tricalcium citrate had reacted with the citric acid and the mixture was virtually completely converted to dicalcium acid citrate. This was shown by filtering the precipitate which had formed, then washing, drying and analyzing it. This was also shown by a caustic titration of the clear liquor, the acid content of which had decreased to a negligible value.

*Example II*

One mole (192 grams) of citric acid was dissolved in a liter of water. One mole (74 grams) of calcium hydroxide was added with stirring, and heat was added to raise the temperature to 90° C. and maintain it at this value for two hours, at the end of which time the mixture was filtered. Dicalcium acid citrate of 96% purity was obtained in 88% yield.

Equivalent amounts of calcium oxide and equivalent amounts of calcium carbonate have each been used in place of calcium hydroxide with similar results in experiments otherwise the same as this example.

*Example III*

One mole (192 grams) of citric acid was dissolved in a liter of water and 0.6 mole (44.4 grams) of calcium hydroxide added with stirring. Heat was added to raise the temperature and maintain it at 40° C. for 2½ hours. At the end of this time the precipitate was filtered, washed dried, and analyzed. Eighty grams of 95% pure dicalcium acid citrate were obtained for an apparent yield of 35%. Since the maximum possible yield was 60%, the actual yield was 59%. The citric acid which remained dissolved in the filtrate was then recovered by precipitating it as tricalcium citrate by the addition of calcium hydroxide in an amount sufficient to produce neutralization. The tricalicum citrate thus obtained may be used as described below in Example IV.

*Example IV*

To a fermentation mixture in which citric acid had been prepared, about 5% of the calcium hydroxide required to produce complete neutrality was added. The resulting precipitate of calcium oxalate was filtered (oxalic acid is formed as a by-product of the fermentation), and the filtrate obtained in this manner was the starting material for this operation. It contained approximately 100 grams of dissolved citric acid per liter of solution.

To one liter of this solution 0.26 mole (130 grams) of tricalcium citrate, which may be obtained as described at the end of Example III, was added with stirring while the temperature was maintained at 90° C. One-fifth of a mole (46 grams) of dicalcium acid citrate was added as seed. The mixture was maintained at 90° C. for 1½ hours and filtered. Dicalcium acid citrate of 92% purity was obtained in an apparent yield of 70% or an actual yield of 94%. The citric acid which remained dissolved in the filtrate was recovered by precipitating it as tricalcium citrate by the addition of calcium hydroxide in an amount sufficient to produce neutralization. This tricalcium citrate may then be used in another run.

*Example V*

To a fermentation mixture in which citric acid had been prepared, about 5% of the calcium hydroxide required to produce complete neutrality was added. The resulting precipitate of calcium oxalate was filtered, and the filtrate obtained in this manner was the starting material for this operation. It contained approximately 100 grams of dissolved citric acid per liter of solution, i. e. about 0.84 lb. of citric acid per gallon of solution.

To 2000 gallons of this solution containing 1640 lbs. of dissolved citric acid there was added 2100 lbs. of tricalcium citrate and 400 lbs. (about 10% of the expected yield) of dicalcium acid citrate. The mixture was maintained at a temperature of 85–90° C. for 1½ hours. At the end of this time, the mixture was filtered and the precipitate washed with water. The precipitate consisted of 98.5% pure dicalcium acid citrate and weighed about 2800 lbs. on a dry basis. The filtrate and wash from the above filtrations was completely neutralized with calcium hydroxide, and the tricalcium citrate which was obtained was filtered off. It had a dry weight of 1500 lbs. and was saved to use in another operation. The filtrate from this filtration contained 108 lbs. of dissolved citric acid salts. Thus, the citric acid introduced in the fermentation mixture was recovered in 94.4% yield.

The above examples are given solely for the purpose of illustration and are not to be construed as limitations on this invention, which is to be limited by only the appended claims.

What is claimed is:

1. A process for precipitating dicalcium acid citrate from an aqueous solution of citric acid, said process comprising heating the solution of citric acid at a temperature above 40° C. in the presence of a calcium containing compound selected from the group consisting of tricalcium citrate, calcium hydroxide, calcium oxide and calcium carbonate, the amount of calcium initially present in the solution being substantially equal to ⅔ of that theoretically required for the complete neutralization of the citric acid.

2. A process as claimed in claim 1, wherein the temperature used is between 80° and 95° C.

3. A process as claimed in claim 1, wherein the solution is seeded with dicalcium acid citrate.

References Cited in the file of this patent

UNITED STATES PATENTS

| 2,027,264 | Bennett | Jan. 7, 1936 |
| 2,396,115 | Nicholls | Mar. 5, 1947 |

FOREIGN PATENTS

| 268,902 | Italy | Nov. 2, 1929 |